Oct. 5, 1965 G. G. MURPHY 3,210,465

FACSIMILE TRANSMITTER COPY FEED

Filed May 31, 1962 2 Sheets-Sheet 1

INVENTOR
GERALD G. MURPHY
BY Edward F. Connors
ATTORNEY

FACSIMILE TRANSMITTER COPY FEED

Filed May 31, 1962 2 Sheets-Sheet 2

INVENTOR
GERALD G. MURPHY
BY Edward V. [signature]
ATTORNEY 3,210,465

FACSIMILE TRANSMITTER COPY FEED

Gerald G. Murphy, Clifton, N.J., assignor to Hogan Faximile Corporation, New York, N.Y.

Filed May 31, 1962, Ser. No. 199,106
2 Claims. (Cl. 178—7.1)

The present invention concerns a copy feed particularly suitable for use with a facsimile transmitter.

In a facsimile system copy such as letters, orders, drawings or any other form of graphic information is scanned line by line so as to produce an electric video signal. Wire or radio links are used to transmit the signal to a receiving station where it actuates a recorder for reproducing the graphic information. In order that the recorded copy have a satisfactory resolution, the original copy is scanned at a rate of about one hundred lines per inch. Heretofore, the typical scanner used in facisimile transmission has been of the "lathe" type. In such scanners the subject copy is wrapped around and secured in position on a cylindrical drum which is rotated. Beside the drum has been a head carrying a light source and a photoelectric cell. The head is moved along a track by a lead screw in a manner similar to that in which a tool head of a lathe is carried. While such scanners have been generally satisfactory they have been subject to the inherent disadvantage that the subject copy must be wrapped around the drum and removed therefrom after each transmision.

More recently continuous scanners have been used such as shown in George M. Stamp's Patent 3,011,020 issued November 28, 1961. In the continuous scanner the subject copy is moved by a roller past a scanning line. A scanning disc carrying a spiral light slit cooperating with a fixed horizontal slit is used for sequential scanning of the subject copy. A suitable optical system and photoelectric means are used to convert the graphic information to the electric video signal. In this construction the subject copy is moved past the scanning area at a continuous rate, the scanning path being slightly curved so that the electric video signal representing the elemental changes in graphic information along the line is practically continuous, an interruption being provided at the end of each scanning line to produce synchronizing or framing signals as is well known in the art.

It is thus obvious that it is important that the copy be moved past the scanning area smoothly and at a uniform rate in order that a sequential signal may be transmitted to the receiving station where the reproduction is made in a similar manner. In the recorder recording media is moved between appropriate electrodes at the same uniform rate of speed.

The subject copy carrying the graphic information which is to be transmitted may vary considerably in nature from thin onionskin paper through stiff paper to cardboard. Further, it is desirable that the subject copy be scanned while flat so as to make unnecessary any straightening operation after the scanning operation and thereby avoiding cracking distortion or other damage to the copy. The present invention is directed to a copy feed for use with a continuous scanner which permits the rapid feeding of successive copy in a flat condition.

In accordance with the invention a belt-type copy feed is provided in which the copy is moved by frictional engagement with the belt past a scanning area against a flat backing plate reference plane.

An object of the invention is to provide a copy feed which accepts even wrinkled copy and presents it to the scanning area in a flattened condition.

Another object of the invention is to provide a copy feed which handles light onionskin copy or cardboard with equal facility.

Other objects and advantages of the invention will be apparent from the following description and from the attached drawings which illustrate an embodiment of the invention.

Figure 1:
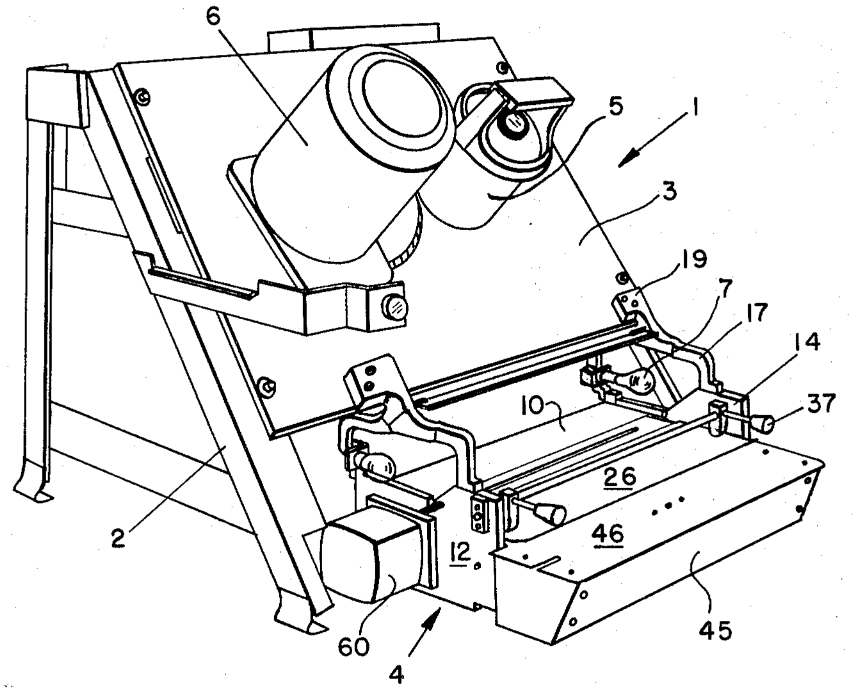
FIGURE 1 is a perspective view of a continuous flat bed facsimile transmittter incorporating a copy feed in acordance with the invention.
Figure 2:
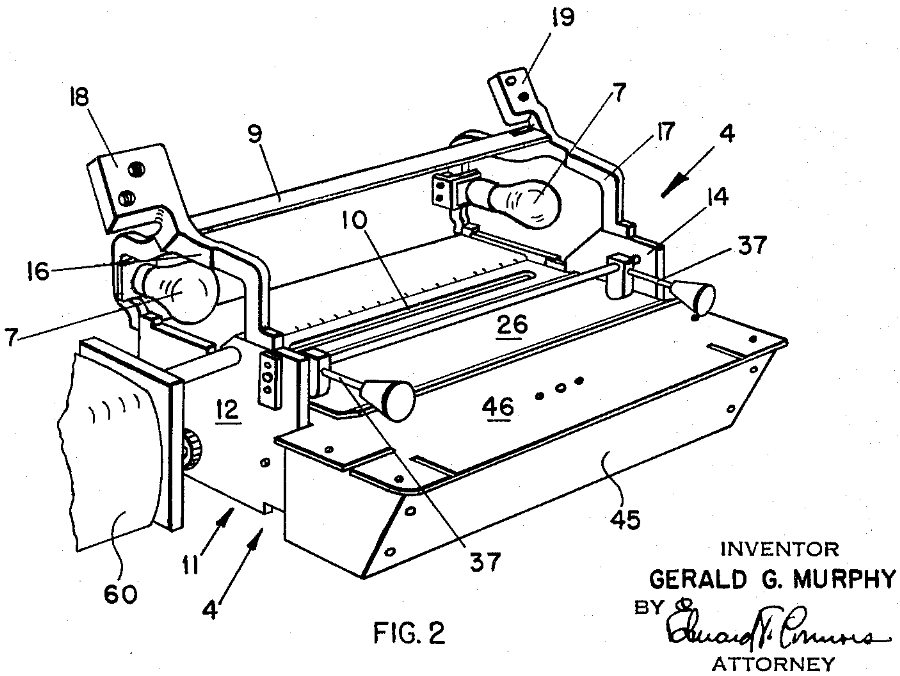
FIGURE 2 is an enlarged perspective view of the copy feed shown in FIGURE 1.

Referring to FIGURE 1 there is shown a facsimile transmitter 1 including a frame 2, a face plate 3 and a copy feed 4 in accordance with the invention. On the face plate 3 is mounted a light gathering optical system 5 and a motor 6 adapted to rotate a scanning disc such as used in the facsimile transmitter described in the aforementioned Patent 3,011,020.

Illumination of the copy is provided by lamps 7 positioned before a reflector 9 so as to direct a long narrow beam of light on scanning area or scanning slot 10. The light system is described more fully and claimed in my copending application, filed on even date herewith and titled, "Facsimile Transmitter Light Assembly," Serial No. 199,107.

The copy feed 4 includes a frame 11 which may be made of side members 12 and 14 attached together by a bottom plate 15. At the upper portion of the side members 12 and 14 are brackets 16 and 17 having legs 18 and 19 for attachment of the copy feed to the face plate 3 of the transmitter 1. The frame 11 includes journalling means for the support of rollers 20 and 21 which are grooved as indicated at 22.

A belt 24 having at least one rib 25 is carried by the rollers 20 and 21, its rib 25 engaging in the grooves 22 of the rollers 20 and 21. Positioned above the belt 24 is a scanning plate 26 having a central portion 27, a leading end 29 and a trailing end 30. The scanning plate 26 is supported by pivotable means 31 at the end of the trailing end portion 30 and is urged away from the belt 24 by spring means 32. The leading end 29 of the scanning plate 26 has a flared edge 34 providing for easy entry of the copy.

The scanning plate 26 is maintained in a predetermined position by means of cam latching means or members 35 carried by a rod 36 and rotated by operating levers 37. The rod 36 is journalled in the side members 12 and 14 of the frame 11. The scanning plate 26 is provided with the scanning area or slot 10 which is about three sixteenths of an inch in width and about eight and one half inches in length for a commercial design. The length of the scanning slot obviously depends upon the width of the copy which is to be transmitted and may be made even 19 inches in length or even longer. The scanning plate 26 is preferably made of aluminum about three thirty-seconds of an inch in thickness, the bottom surface being polished on the central portion 27 thereof in the direction of travel of the belt 24. At the leading side of the slot 10, on the underside of the central portion 27, is a right angle surface 38 the effect of which is described hereinafter.

An intermediate roller 39 is carried by a shaft 40 journalled in blocks 41 slideably mounted in slots 42 in the frames 12 and 14 and grooved as indicated at 43. A spring 44 for each of the journal blocks 41 tends to urge the intermediate roller 39 against the underside of the belt so as to provide support therefor at the scanning slot 10.

The intermediate roller 39 is about one half inch in diameter.

Attached to the frame 11 is a pedestal 45 carrying a feeding surface plate 46 which is positioned in front of the roller 21 and in alignment with the top surface of the belt 24. Mounted on the underside of the feeding surface plate 46 is a starting switch 47 and an operation indicating lamp 48, the switch 47 having an operating arm 49 extending through a slot 50 in the scanning plate 26. On the under surface of the scanning plate 26 is a grab spring 51. The action of the starting switch 47 and of the grab spring 51 provide means for precisely signalling the start of a transmission and are described in my copending application filed on even date herewith and titled, "Controlled Facsimile System," Serial No. 199,112.

A paper stripper 52 is attached to the bottom plate 15 by a screw 54 and is directed against the belt 24 under the trailing end 30 of the scanning plate 26 to contact the belt 24 approximately in the middle of its curved surface along the axis of shafts 55. The roller 20 is rotated by a gear 56 at its outer end in mesh with a driving gear 57 carried by a shaft 59 of a motor 60. The motor 60 is supported by spacers 61 engaged with the side members 12.

Figure 3:
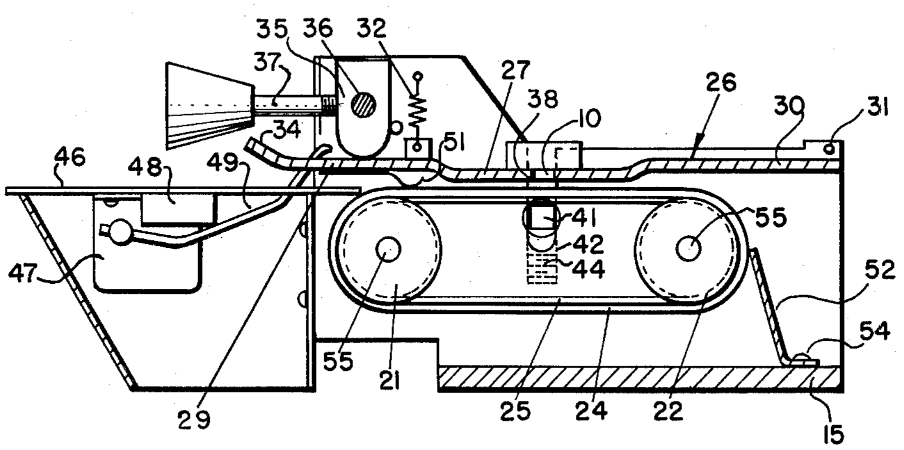
FIGURE 3 is a sectional view of the copy feed taken along the line 3—3 of FIGURE 4.
Figure 4:
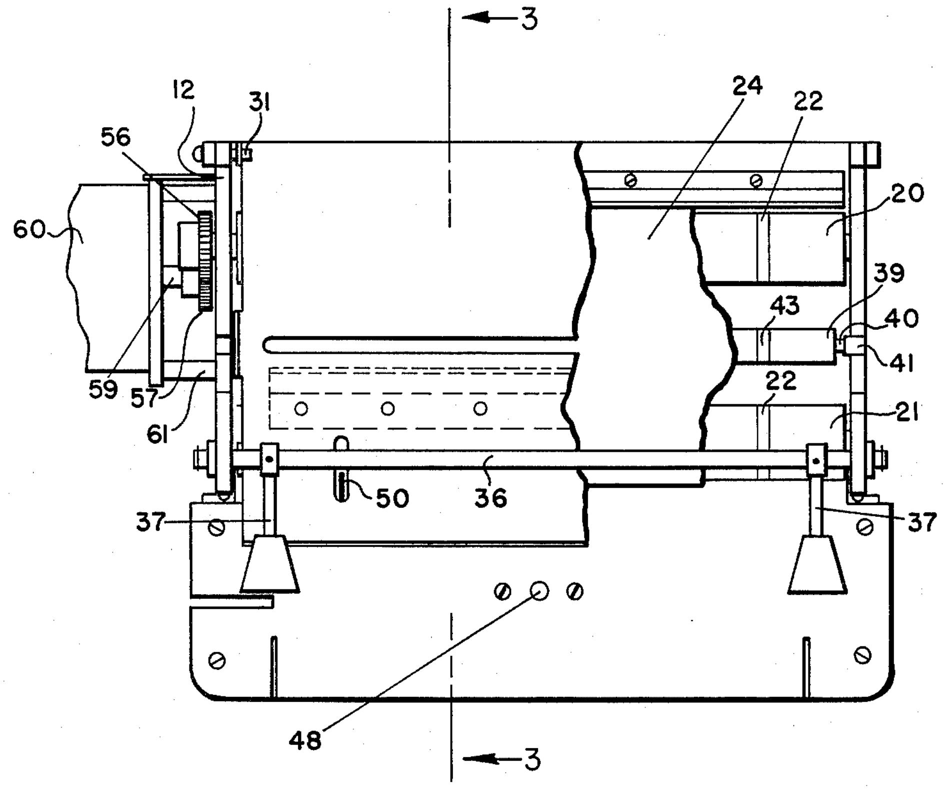
FIGURE 4 is a top view of the copy feed with portions broken away to show the mechanism more clearly.

In the operation of the copy feed subject copy is passed over the feeding surface plate 46 past the operating arm 49 of the switch 47 into contact between the belt 24 and the grab spring 51. The copy is frictionally engaged by the belt 24 and carried against the under surface of the center portion 27 of the scanning plate 26. By the pressure between the belt and the underside of the scanning plate 26, the copy, if previously wrinkled, is smoothened upon reaching the scanning slot 10. An additional smoothing action takes place as the copy is carried past edge 38 of the scanning slot 10. At this point there is a tendency for the belt 24 to wipe the paper slightly across the edge 38 which is believed to provide the additional smoothing effect. As may be seen in FIGURE 3, and as stated heretofore, the intermediate roller 39 urges the belt 24 against the edges of the slot 10. By this means there is produced pressure against the back of the copy against the edges of the slot 10.

While the invention has been described and illustrated with respect to a specific embodiment thereof it will be understood that other embodiments may be resorted to without departing from the invention. Therefore, the form of the invention set out above should be considered as illustrative and not as limiting the scope of the following claims.

I claim:

1. A copy feed for a facsimile transmitter comprising a frame, a pair of grooved rollers journalled in the frame, a ribbed belt carried by the rollers with its rib engaged in the grooves of the rollers, a scanning plate extending generally parallel to the surface of the belt between the rollers, the plate having a central portion and leading and trailing end portions, the central portion having a length approximately equal to the spacing of the roller surfaces, the central portion in contact with the belt, the leading and trailing end portions spaced from the belt, the leading end having a flared edge, means forming a scanning slot in the central portion of the plate, the slot extending transversely with respect to the direction of travel of the belt, pivotable supporting means for the plate on the frame positioned at the end of the trailing edge portion, spring means tending to rotate the plate away from the belt, lever actuated cam means acting in opposition to the spring means and with the pivotable supporting means establishing a fixed operating position for the plate, intermediate roller means positioned under the belt in alignment with the scanning slot, spring urged supporting means for the intermediate roller urging the belt into contact with the scanning slot, and means forming a feeding surface positioned outwardly of the leading end of the plate in alignment with the top surface of the belt.

2. A copy feed for a facsimile transmitter comprising a frame, a pair of grooved rollers journalled in the frame, a ribbed belt carried by the rollers with its rib engaged in the grooves of the rollers, a scanning plate extending generally parallel to the surface of the belt between the rollers, the plate having a central portion and leading and trailing end portions, the central portion having a length approximately equal to the spacing of the roller surfaces, the central portion in contact with the belt, the leading and trailing end portions spaced from the belt, the leading end having a flared edge, means forming a scanning slot in the central portion of the plate, the slot extending transversely with respect to the direction of travel of the belt, pivotable supporting means for the plate on the frame positioned at the end of the trailing edge portion, spring means tending to rotate the plate away from the belt, lever actuated cam means acting in opposition to the spring means and with the pivotable supporting means establishing a fixed operating position for the belt, intermediate roller means positioned under the belt in alignment with the scanning slot, spring urged supporting means for the intermediate roller urging the belt into contact with the scanning slot, means forming a feeding surface positioned outwardly of the leading end of the plate in alignment with the top surface of the belt, and a paper stripper directed against the belt under the trailing end of the plate.

References Cited by the Examiner

UNITED STATES PATENTS

| | | | |
|---|---|---|---|
| 2,092,158 | 9/37 | Hasbrouck et al. | 179—100.3 |
| 2,262,584 | 11/41 | Herriott | 178—7.6 |
| 2,339,835 | 1/44 | Burckhardt | 271—35 |
| 2,585,873 | 2/52 | Stephenson | 271—36 |
| 2,792,448 | 5/57 | Deuth et al. | 178—7.6 |

DAVID G. REDINBAUGH, *Primary Examiner.*